(No Model.) 2 Sheets—Sheet 1.
D. TUFTS.
CAR COUPLING LINK.
No. 351,723. Patented Oct. 26, 1886.
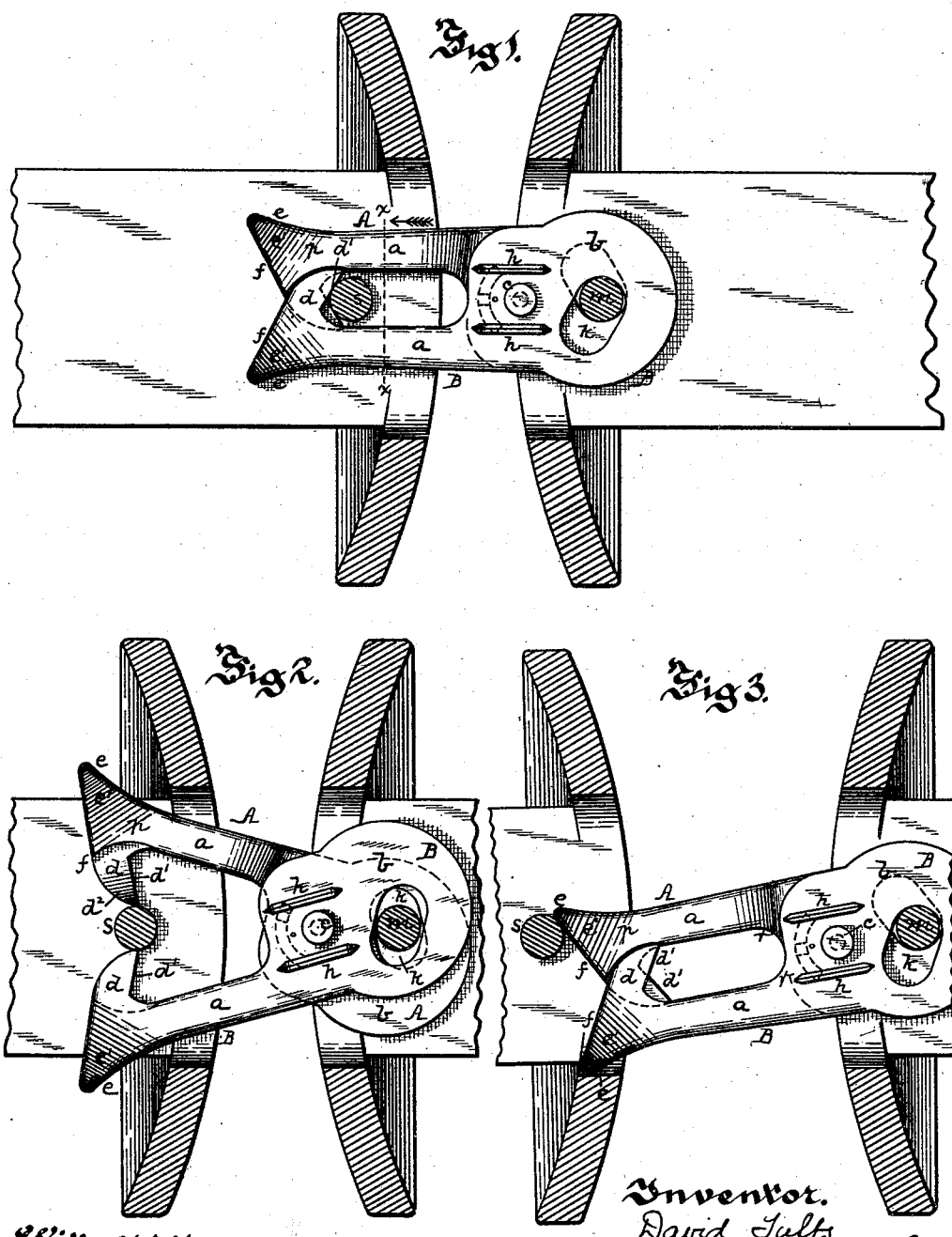

(No Model.) 2 Sheets—Sheet 2.
D. TUFTS.
CAR COUPLING LINK.
No. 351,723. Patented Oct. 26, 1886.
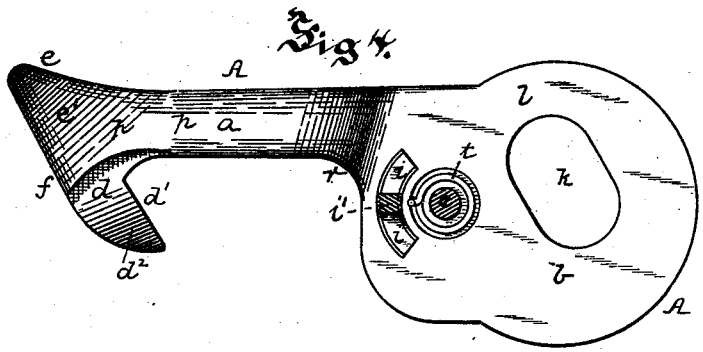
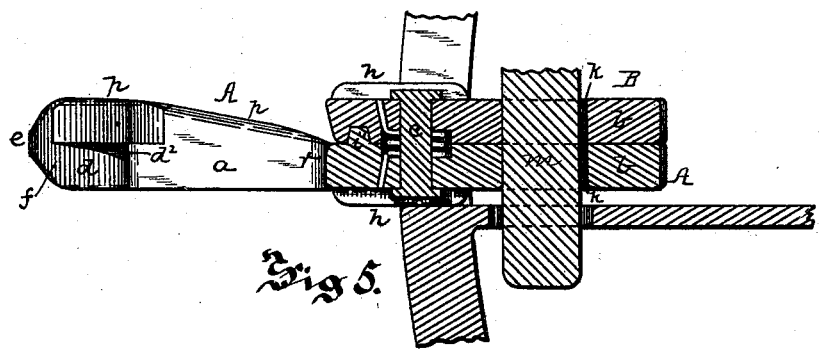
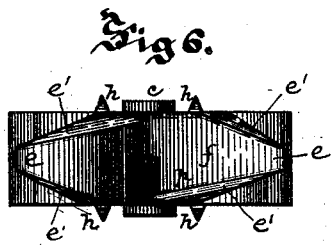
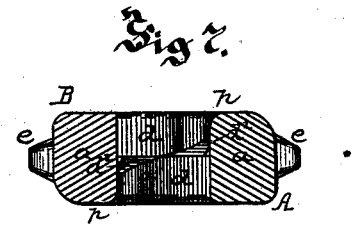
Witnesses:
J. N. Cooke
J. E. Barnes
Inventor.
David Tufts
By James J. Kay
Attorney

UNITED STATES PATENT OFFICE.

DAVID TUFTS, OF PITTSBURG, PENNSYLVANIA.

CAR-COUPLING LINK.

SPECIFICATION forming part of Letters Patent No. 351,723, dated October 26, 1886.

Application filed August 20, 1886. Serial No. 211,383. (No model.)

*To all whom it may concern:*

Be it known that I, DAVID TUFTS, of Pittsburg, in the county of Allegheny and State of Pennsylvania, have invented a new and useful Improvement in Car-Coupling Links; and I do hereby declare the following to be a full, clear, and exact description thereof.

My invention relates to the coupling links to be employed for connecting the draw-heads of car-couplings, its object being to provide an automatic coupling-link which can be opened by a pin in the opposite draw-head, and will close upon the same and so form a strong connection therewith, the invention re'ating especially to that class of car-coupling links formed of jaws pivoted together and having hooks and inclined end faces forming a V-shaped forward end, the link being supported in one draw-head and arranged to enter the opposite draw-head and be opened by the pin therein, the hooks closing around the pin, and so coupling the car.

The invention consists in certain improvements in the construction of this class of car-coupling links, said improvements, generally stated, being as follows: First, in forming the inner edges of the hooks inclined backwardly from the body of the jaw, so that when the pin presses against these hooks it will always press against both hooks of the link, and its action will be such as to close the hooks by its longitudinal pressure thereon; second, in forming the faces of the hooks in the jaws, where they pass each other, rounded off to prevent them from striking against each other as they close around the pin, thus insuring the perfect action of the draw-head in closing; third, in forming at the rear of each jaw of the coupling-link cross-slots through which the pin of the draw-head to which the link is first connected passes, these cross-slots permitting the opening of the link by the pressure of the pin in the opposite draw-head on the forward end thereof, and when the link is closed by its spring the end faces of the slots bearing against the pin passing through the same, and, by binding thereon, preventing the swinging of the link, and holding it in proper position for coupling; fourth, in closing the ends of these cross-slots, so as to add strength to the link, while at the same time the straps closing these slots act as stops to prevent the links from being opened too wide, the straps on the body of the link coming in contact with the pin passing through the slots, and so limiting the spreading motion of the link; fifth, in forming these slots extending diagonally forward toward the sides of the rear extension of the link, so that when a coupling is made by the link the pressure of the pin within these slots or draft-strain on the link will cause the closing of the link, while at the same time a greater bearing on the link extending through the slots is obtained, and in case the spring should break, the pressure of the pin in said diagonally-extending slots will hold the link closed and prevent accident; sixth, in providing the link with longitudinal ribs on each side of the pivot-bolt thereof of as great height or higher than the bolt-head, so as to protect the bolt-head from wear or strain, and at the same time to hold the free end of the link higher than the portion confined within the draw-head, and so enable it to enter the opposite draw-head more easily; seventh, in forming in the body of the jaw and in front of the pivot-bolt thereof an arc groove or depression and providing the other jaw with a corrospondingly-shaped lug, which fits within this groove and acts to take the strain off the pivot-bolts in case of heavy blows on the forward end of either jaw. The arc slot and lug will act to hold the two jaws in proper relative position, thus relieving the pivot bolts from such strains and preventing its being bent out of shape thereby.

To enable others skilled in the art to make and use my invention, I will describe the same more fully, referring to the accompanying drawings, in which—

Figures 1, 2, and 3 are top views of the coupling-link and horizontal sections of the draw-heads, showing the operation of the coupling-link. Fig. 4 is a face view of one of the jaws of the link. Fig. 5 is a cross-section through the link when it is spread apart. Fig. 6 is an end view of the link, and Fig. 7 is a cross-section thereof on the line $x\,x$, Fig. 1.

My improved coupling-link is formed of two jaws, A B, these jaws being of the same shape and being pivoted together by means of a bolt, $c$, passing through the body of the jaws back of the arms $a\,a$ thereof. At the forward end of each jaw is formed a hook, d, and at the ends of the arms of the jaw, extending beyond these hooks are the horns e, while the end faces, f, of the jaws are inclined backwardly from these horns e to the ends of the hooks, as shown, these inclined faces f imparting a wedge face to the link when closed, so that as the link enters the opposite draw-head the pin s therein will pass down either inclined face, and by pressing thereon cause the opening of the link, so that the pin will enter the link and the jaws thereof close upon it. The horns e of the jaws extend out beyond the arms thereof, the forward end of the link being thus made wider than across the arms a, so that the link at the forward end is of sufficient width to insure the striking of one or the other inclined face, f, against the coupling-pin in the opposite draw-head, no matter in what position it may enter the mouth of the draw-head.

As these links are especially to be employed with the ordinary wrought-metal draw-head, now in almost universal use with freight cars, after the forward part of the link enters the draw-head and is spread by the pin, as before described, the horns will pass out on each side of the mouth of the draw-head, these portions of the draw-head being open, and the body of the link will be sufficiently narrow to permit it to open sufficiently wide within the draw-head mouth to allow the pin to enter between the hooks. The top and bottom faces, e', of the jaws are tapered toward the pointed ends of the horns e, as shown, so that in case the link should be too low or too high to enter the opposite draw-head, the pointed ends of the hooks will pass within the mouth of the draw-head and the inclined faces raise or lower the link, so that it enters said mouth, the pointed horns e thus preventing the link from striking against the front face of the draw-head. The hooks d of the draw-head are provided with inner faces or edges, inclined backwardly from the body of the arms toward the points of the hooks shown at d', so that after the pin passes within the link the longitudinal strain on said backwardly-inclined faces d' will, by pressing on these inclined faces, draw the jaws toward each other; and as the faces are thus inclined the coupling-pin will always press against both faces, thus causing the draft-strain to be sustained upon both jaws, and in so doing relieving the pivoting-bolt from heavy strain, the draft-strain being sustained by both hooks and by the rear extensions, b b, of the jaws, the coupling-pin m passing through the cross-slots k in said rear extensions.

As these coupling-links are subjected to very severe strain and heavy jarring blows, it is evident that the ends of the hooks might be so upset as to prevent their passing each other and closing around the pin, and to provide against this difficulty the faces of these hooks toward each other are rounded off, as shown at $d^2$, Fig. 7, so that there are no shoulders which could come in contact and catch, as above described, the said rounded faces enabling the hooks to pass each other, even though they may be upset out of shape.

The two jaws of the coupling-link, as above stated, are pivoted together by the bolt c, passing through the body thereof, and in the rear of this bolt are the extensions b b, within which are formed the cross-slots k, and the coupling-pin m in the draw-head to which the link is first secured passes through these cross-slots, and the body of the link resting, as shown, on the base of the mouth of the draw-head. The spring t, by means of which the jaws are caused to close around the pin and couple, is secured within the link in the annular recesses formed in the jaws; and in order to prevent the bending of the pivoting-bolt one jaw, A, is provided with an arc groove, i, said groove being drawn from the pivot-bolt as a center, and said groove extending in front of the pivot-bolt, and the other jaw, B, is provided with a lug, which fits within this arc groove, so that as the link is opened and closed this lug i' will move within the groove, interfering in no way with the operation of the link. In case, however, the forward end of either jaw of the link should strike against the opposite draw-head, (in which case a very heavy strain would be thrown upon the pivot-bolt,) this lug and groove act to protect the bolt from such strain, as they hold the two jaws of the link in proper line longitudinally, and any blow on one jaw will be carried to the other jaw through the said lug in the groove, so that the heavy shock or blow is sustained by this lug fitting within the groove, instead of by the pivot-bolt.

In order to protect the heads of the pivot-bolt, I form on the body of the link longitudinal ribs, h, these ribs being of a height equal to or greater than that of the pivot-bolt, and extending from a point just back of the pivot-bolt forward along the body of the link, and these ribs act to hold the body of the link up from the base of the draw-head in such position that no matter what strain is brought upon the link the pivot-bolt is protected thereby. At the same time these ribs serve the further purpose of holding up the outer or coupling end of the link, as where the coupling-pin passes through the cross-slots, and the rear extension of the link in the walls of said slots do not bind firmly upon the pin, there would be a tendency of the link to sag downward in such position that it would not readily enter the opposite draw-head. These longitudinal ribs, however, rest upon the base of the mouth of the draw-head and hold the forward end up in such position that the forward end of the link is raised slightly above the rear portion thereof, and in coupling cars where the draw-heads are of the same height the forward end of the link will enter about the center of the draw-head, these ribs thus acting to insure the coupling of the cars.

As above referred to, the link is provided at the rear end with transverse or cross slots $k$, these slots extending across the rear extension, so that when the link is closed the inner walls of the slots bind upon the pin which passes through them, these walls thus acting as stops to limit the motion of the jaws in closing. The slots are, however, of sufficient length to permit the link to be opened, the rear extensions, $b\ b$, sliding past each other as the jaws are drawn apart, and the pin extending through these cross-slots having free movement therein until the straps $l$, which close the ends of the cross-slots, strike against said pin, and thus limit the motion of the draw-head in opening. If desired, these slots may be open at the outer ends; but I prefer to close them, as shown, as the straps $l$, across the outer ends of the slots, beside acting as stops to limit the motion of the jaws in opening, and thus protecting the spring, add greatly to the strength of the links. These cross-slots $k$ extend diagonally across the rear extension of the draw-head, as shown, said slots extending from the points where they bind around the pin where the link is closed forward in the diagonal direction, toward the sides of the rear extensions, so that when the coupling is made the pin extending through these slots is at the rearmost position therein, and any drawing strain on the link will cause the walls of the slots to bind firmly around the pin, and at the same time said drawing strain, in case the link is opened slightly, will act to draw the pin to the rearmost position of the slots and hold it there, so not only through the faces of the hooks $d$, but also through these diagonal cross-slots in the rear of the link, holding the link closed around the pin which enters between the jaws. As soon as the jaws have closed sufficiently around the pin entering between them to give a hold thereon, in case the draft shall come upon the link before it is entirely closed the pressure on these inclined faces will draw the link close and hold it so, the spring being only required to cause the closing of the jaws around the pin and no heavy strain being brought upon it. Another advantage obtained from this construction is that a better hold is obtained on the pin extending through the diagonal cross-slots, as the walls of these slots fit almost entirely around said pin, and the pressure of the spring will cause the end walls of the slots to bind more firmly upon the pin, and so hold the link more steadily in the proper position for coupling.

As above set forth, the top and bottom faces of the forward ends or horns of the link are tapered toward the points of the horns, in order to cause the link to enter the opposite draw-head more easily, and for this reason the forward ends of the jaws are increased in thickness, as at $p$, so as to bring the faces of each jaw, where the hook of the opposite jaw fits against it, to substantially the same height as said hook; and in order to strengthen the arms of the jaws the metal thereof is gradually increased from the body upwardly to the shoulder or seat for the hook of the opposite draw-head, this increase of metal thus greatly increasing the strength of the arms and enabling them to withstand the heavy strain brought upon them. At the same time, at the point where this metal decreases in thickness, the arm is increased in width, as at $r$, thus imparting full strength to the arms where they are connected to the body of the jaw.

In forming a coupling with my improved link the coupling-pin $m$ of one draw-head is raised, the rear extensions of the link and the body thereof inserted within the draw-head, and the pin $m$ passed down through the cross-slots $k$ in said rear extensions. The jaws of the link are held closed by the spring $t$, and the inner walls of these slots $k$ bind around the pin, so through their hold or bind thereon holding the coupling-link in such position that its forward end will not sag downwardly, while as the longitudinal ribs $h$ rest upon the base of the mouth of the draw-head the forward end is raised slightly into the best position for entering the opposite draw-head, where the draw-heads are on the same level. In forming the coupling the pin $s$ in the opposite draw-head is inserted in its usual position, and all that is required of the brakeman is to see that the forward end of the link is in proper line to enter the opposite draw-head, and this he can do before the cars come so close as to cause any danger to him. As the cars come together, the forward end of the link passes into the mouth of the draw-head, and one inclined face $f$ strikes against the pin, so drawing the link into line with said pin, and the said pin, pressing on said inclined faces, causes the opening of the link until it passes beyond the hooks $d$ thereof and into the elongated space between the arms. The spring $t$ then closes the jaws, and upon any draft on the link it is held closed by the strain of the pin $s$ on the inclined inner faces, $d'$, of the hooks, as well as by the pressure of the other coupling-pin, $m$, in the diagonal cross-slots $k$ in the rear portion of the link, the strain thereon being sustained by both hooks of the jaws and by the link passing through the rear extensions thereof and the pivot-bolt being substantially free from strain. In case the link is too high or too low to enter the opposite draw-head, the inclined top and bottom faces of the horns thereof will lower or raise it, so that it is directed into the draw-head. The forward end of the link is of such width that there is no opportunity for it to pass on either side of the coupling-pin $s$ as it enters, one or the other inclined face $f$ always striking against said pin, and at the same time, after the link enters said draw-head and is spread by the pin passing between the jaws thereof, as the link is narrow back of the horns, it can be opened sufficiently to permit the pin to enter without spreading the arms to such an extent that they strike against the end walls of the draw-head mouth. When the jaws close, they will pass each other without liability of catching on each other on account of the rounded portions of the adjacent faces $d^2$ of said hooks.

What I claim as my invention, and desire to secure by Letters Patent, is—

1. A car-coupling link formed of two jaws pivoted together and having hooks at the ends, said hooks fitting past each other and having straight inner edges inclined backwardly from the bodies of the jaws to the points, substantially as and for the purposes set forth.

2. A car-coupling link formed of two jaws pivoted together and having hooks at or near the forward ends and fitting past each other, the faces of said hooks adjacent to each other being rounded off toward the point to prevent them from striking against each other as they close around the pin, substantially as set forth.

3. A car-coupling link formed of two hooked jaws pivoted together and provided with rear extensions beyond the pivotal point thereof, these rear extensions having cross-slots therein to receive the pin by which the link is connected to the draw-head, substantially as set forth.

4. A car-coupling link formed of two hooked jaws pivoted together and having rear extensions beyond the pivotal point thereof, said rear extensions having inclosed cross-slots therein, substantially as and for the purposes set forth.

5. A car-coupling link formed of two hooked jaws pivoted together and provided with rear extensions beyond the pivotal point thereof, said rear extensions having cross-slots formed therein, and said slots extending diagonally forward toward the sides of the rear extensions, substantially as and for the purposes set forth.

6. A car-coupling link formed of two hooked jaws pivoted together and provided with longitudinal ribs on each side of the pivot thereof, substantially as and for the purposes set forth.

7. A car-coupling link formed of two hooked jaws pivoted together, one of said jaws being provided with an arc groove in front of the said pivot, and the other with a lug fitting within said groove, substantially as and for the purposes set forth.

8. A car-coupling link formed of two jaws pivoted together and provided with hooks fitting past each other, said jaws having shoulders against which the hooks fit and of substantially the height of said hooks, and the top and bottom faces of the jaws tapering from said hooks and shoulders toward the forward ends of the jaws, substantially as and for the purposes set forth.

9. A car-coupling link formed of two jaws pivoted together and having arms provided with hooks at or near the forward ends thereof and shoulders against which said hooks fit, the bodies of the arms being gradually increased in thickness from the bodies of the jaws to said shoulders, substantially as and for the purposes set forth.

In testimony whereof I, the said DAVID TUFTS, have hereunto set my hand.

DAVID TUFTS.

Witnesses:
JAMES I. KAY,
J. N. COOKE.